US008673495B2

(12) United States Patent
Tong et al.

(10) Patent No.: US 8,673,495 B2
(45) Date of Patent: Mar. 18, 2014

(54) SILVER OXYFLUORIDE ELECTRODE COMPOSITIONS AND METHODS

(75) Inventors: Wei Tong, Piscataway, NJ (US); Glenn Amatucci, Peapack, NJ (US)

(73) Assignee: Rutgers, The State University of NJ, New Brunswick, NJ (US)

( * ) Notice: Subject to any disclaimer, the term of this patent is extended or adjusted under 35 U.S.C. 154(b) by 503 days.

(21) Appl. No.: 12/600,051

(22) PCT Filed: May 12, 2008

(86) PCT No.: PCT/US2008/063380
§ 371 (c)(1),
(2), (4) Date: Aug. 10, 2010

(87) PCT Pub. No.: WO2008/144271
PCT Pub. Date: Nov. 27, 2008

(65) Prior Publication Data
US 2010/0297499 A1 Nov. 25, 2010

Related U.S. Application Data

(60) Provisional application No. 60/930,486, filed on May 16, 2007.

(51) Int. Cl.
*H01M 4/34* (2006.01)

(52) U.S. Cl.
USPC .......................................... 429/219

(58) Field of Classification Search
USPC .......................................... 429/219
See application file for complete search history.

(56) References Cited

U.S. PATENT DOCUMENTS 7,790,317 B1 * 9/2010 Poeppelmeier et al. ...... 429/219

* cited by examiner

*Primary Examiner* — Stuart Hendrickson
(74) *Attorney, Agent, or Firm* — Beverly W. Lubit; Greenberg Traurig, LLP

(57) ABSTRACT

The present invention relates to a novel class of silver oxyfluoride based electrode materials based on the perovskite structure used in primary and rechargeable electromechanical energy storage systems.

37 Claims, 7 Drawing Sheets

SILVER OXYFLUORIDE ELECTRODE COMPOSITIONS AND METHODS

CROSS-REFERENCE TO RELATED APPLICATIONS

This application claims the benefit of priority to U.S. Provisional Application No. 60/930,486 filed May 16, 2007, the entire contents of which are incorporated herein by reference.

FIELD OF THE INVENTION

The present invention relates to primary and secondary electrochemical energy storage systems, particularly to such systems as battery cells, which use materials that take up and release ions as a means of storing and supplying electrical energy.

BACKGROUND OF THE INVENTION

The lithium-ion battery cell is the premiere high-energy rechargeable energy storage technology of the present day. Unfortunately, its high performance still falls short of energy density goals in applications ranging from telecommunications to biomedical. Although a number of factors within the cell contribute to this performance parameter, the most crucial ones relate to how much energy can be stored in the electrode materials of the cell.

During the course of development of rechargeable electrochemical cells, such as lithium (Li) and lithium-ion battery cells and the like, numerous materials capable of reversibly accommodating lithium ions have been investigated. Among these, occlusion and intercalation materials, such as carbonaceous compounds, layered transition metal oxides, and three dimensional pathway spinels, have proved to be particularly well suited to such positive electrode applications. However, even while performing reasonably well in recycling electrical storage systems of significant capacity, many of these materials exhibit detrimental properties, such as marginal environmental compatibility and safety, which detract from the ultimate acceptability of the batteries. However, of most importance is the fact that the present state of the art materials only have the capability to store relatively low capacity of charge per weight or volume of material (e.g. specific capacity, (mAh/g); gravimetric energy density (Wh/kg$^{-1}$); volumetric energy density, (Wh/L$^{-1}$)). Volumetric capacity is of particular importance in many applications.

Materials of choice in the fabrication of rechargeable battery cells, particularly highly desirable and broadly implemented Li-ion cells, for some considerable time have centered upon graphite negative electrode compositions, which provide respectable capacity levels in the range of 300 mAh/g. Unfortunately, complementary positive electrode materials in present cells are less effective layered intercalation compounds, such as $LiCoO_2$, which generally provide capacities only in the range of 150 mAh/g. Other positive electrode materials of utility for primary lithium batteries include manganese oxides and silver vanadium oxides.

Intercalation compounds are not highly effective because the intercalation process is not an ideal energy storage mechanism. This situation occurs because of the limited number of vacancies available for the guest lithium ion. An alternative process reversible conversion, allows for all of the oxidation states of a compound to be utilized. The reversible conversion reaction proceeds as follows:

$$zLi^+ + ze^- + MeX \leftrightarrow Li_zX + Me$$

where Me is a metal and X is $O^{2-}$, $S^{2-}$, $N^{3-}$ or $F^-$. This reaction can lead to much higher capacities than can an intercalation reaction and, therefore, to much higher energy densities.

Badway et al. (*Journal of the Electrochemical Society*, 150(9) A1209-A1218 (2003)), for example, has described electrode materials having high specific capacities via a reversible conversion reaction. They reported specific capacities for carbon metal fluoride nanocomposites, such as a carbon $FeF_3$ nanocomposite, active for this reaction, having >90% recovery of its theoretical capacity (>600 mAh/g) in the 4.5-1.5 V region. They attained this major improvement in specific capacity by reducing the particle size of $FeF_3$ to the nanodimension level in combination with highly conductive carbon.

Other metal fluorides are capable of reversible conversion as well. For example, bismuth metal fluorides, such as $BiF_3$, are capable of reversible conversion. As mentioned above, reversible conversion reactions also have been observed in metal oxides as well as metal fluorides. Because metal fluorides are more ionic than metal oxides, the discharge voltage of a given fluoride compound will always be higher than the discharge voltage of the corresponding oxide, thereby leading to greater specific energies and attractiveness as future positive electrode materials. Another effect of the higher ionicity of the metal fluorides with respect to the metal oxides is that the generally lower band gap oxides have relatively good electronic conductivity while the high band gap fluorides are electronic insulators. As a direct consequence, it has been shown that the preparation of a metal fluoride/conductive matrix nanocomposite is necessary in order to enable the electrochemical activity of the higher voltage metal fluorides whereas the oxides can be utilized in their macro state.

The electroactivity of metal fluoride (e.g., $BiF_3$, $CuF_2$, and $FeF_3$) conversion materials with relatively high output voltage (approximately 3V) and high volumetric energy density through the use of nanocomposites by introduction of highly conductive carbon black and/or mixed conductor matrices to the metal fluorides has been demonstrated (Badway, F., et al., *J. Electrochem. Soc.*, 150, A1318, 2003; Bervas, M., et al., *Electrochem. Solid-State Lett.*, 8, A179, 2005; Badway, F., et al., *Chem. Mater.*, 19, 4129, 2007). Silver fluoride has a higher output voltage (>3.5V), energy density (9.1 Wh/cc) and an assumed high electrical conductivity with the formation of the Ag product of conversion than $CuF_2$ (8.25 Wh/cc) and $CF_1$ (6.79 Wh/cc) making it superior to $CuF_2$ and $CuF_1$. However, experimentation has shown the highly oxidative $AgF_2$ excludes the conventional approach to enable its electroactivity through nanocomposites by carbon black.

Hence, there is a need in the art for electrical energy-storage and delivery capable of using stabilized silver fluoride within nanocomposites or new structures in order to combine both good electronic conductivity as well as high voltage capabilities.

SUMMARY OF THE INVENTION

The present invention provides improved materials for battery components, specifically for electrodes in primary and rechargeable electrochemical storage systems. In one aspect, the present invention provides a composition comprising a silver metal oxyfluoride compound. According to one embodiment, the silver metal oxyfluoride compound of the composition is of nanocrystallite size. According to another embodiment the silver metal oxyfluoride compound is of a perovskite related crystal structure. According to another embodiment, the composition comprises $Ag^{1+}_y Me^{n+}_1 O^{2-}_x F^{1-}_z$ where $0.75 < y < 10$; $x > 0$ and $z > 0$; $2x + 1z = y + n$; and $2 < n^+$ <6. According to another embodiment, 1<y<5. According to another embodiment, 3<y<5. According to another embodiment, y=3. According to another embodiment, x=z. According to another embodiment, Me is a transition metal. According to another embodiment, Me is a first row transition metal. According to another embodiment, Me is a second row transition metal. According to another embodiment, Me is a metal selected from the group consisting of Bi, Cu, Mo, V, Nb, or any mixture thereof. According to another embodiment, the silver oxyfluoride compound comprises a nanoperovskite. According to another embodiment, the nanoperovskite has a diameter of about 1 nm to about 100 nm. According to another embodiment, the nanoperovskite has a diameter of about 20 nm to about 50 nm. According to another embodiment, the nanoperovskite is a distorted nanoperovskite. According to another embodiment, the nanoperovskite is a cryolite perovskite structure. According to another embodiment, the silver oxyfluoride compound further comprises a conductive matrix. According to another embodiment, the conductive matrix is a conductive matrix selected from the group consisting of $VO_2$, $MoO_2$, $MoO_3$, $V_2O_5$, $V_6O_{13}$, NiO, CuO, Ag, $Ag_2F$, a carbon fluoride, a molybdenum sulfide, a molybdenum oxysulfide, titanium sulfide, phosphates, tellurides, selenides, chromium oxide, and manganese oxide ($MnO_2$). According to another embodiment, the silver oxyfluoride compound comprises a partially substituted silver oxyfluoride compound. According to another embodiment, the partially substituted silver oxyfluoride compound comprises $Ag^{1+}{}_yMe^{n+}{}_1O^{2-}{}_xF^{1-}{}_z$, wherein $0.75<y<10$; $x>0$ and $z>0$; $2x+1z=y+n$; $2<n^+<6$; where Me is a partially substituted component consisting of $Me_{1-w}$ where $(1-w)=100\%$ of the partially substituted component consisting of $Me_{1-w}$, (w) refers to percentage of substituted of Me, and (w) is less than 50%. According to another embodiment, 1<y<5. According to another embodiment, 3<y<5. According to another embodiment, y=3. According to another embodiment, x=z. According to another embodiment, Me is a transition metal. According to another embodiment, Me is a first row transition metal. According to another embodiment, Me is a second row transition metal. According to another embodiment, Me is a metal selected from the group consisting of Bi, Cu, Mo, V, Nb, or any mixture thereof, and w is not 0. According to another embodiment, the partially substituted Me component $Me_{1-w}$ is partially substituted with atoms selected from the group consisting of V, Ti, Cr, Mn, Fe, Co, Ni, Cu and Ga. According to another embodiment, the partially substituted silver oxyfluoride compound comprises a perovskite structure. According to another embodiment, the structure is of a nanoperovskite. According to another embodiment, the nanoperovskite has a diameter of about 1 nm to about 100 nm. According to another embodiment, the nanoperovskite has a diameter of about 20 nm to about 50 nm. According to another embodiment, the nanoperovskite is a distorted nanoperovskite. According to another embodiment, the nanoperovskite is a cryolite perovskite structure. According to another embodiment, the partially substituted silver oxyfluoride compound further comprises a conductive matrix. According to another embodiment, the conductive matrix is a conductive matrix selected from the group consisting essentially of $VO_2$, $MoO_2$, $MoO_3$, $V_2O_5$, $V_6O_{13}$, NiO, CuO, Ag, $Ag_2F$, carbon fluorides, molybdenum sulfides, phosphates, tellurides, selenides, molybdenum oxysulfides, titanium sulfide, chromium oxide, manganese oxide.

In another aspect, the present invention provides an electrochemical cell comprising a negative electrode, a positive electrode comprising a silver oxyfluoride compound, and a separator disposed between the negative and positive electrodes. According to one embodiment, the silver oxyfluoride comprises $Ag^{1+}{}_yMe^{n+}{}_1O^{2-}{}_xF^{1-}{}_z$, where $0.75<y<10$; $x>0$ and $z>0$; $2x+1z=y+n$; and $2<n^+<6$. According to another embodiment, 1<y <5. According to another embodiment, 3<y<5. According to another embodiment, y=3. According to another embodiment, x=z. According to another embodiment, Me is a transition metal. According to another embodiment, Me is a first row transition metal. According to another embodiment, Me is a second row transition metal. According to another embodiment, Me is a metal selected from the group consisting of Bi, Cu, Mo, V, Nb, or any mixture thereof. According to another embodiment, the silver oxyfluoride compound comprises a nanoperovskite. According to another embodiment, the nanoperovskite has a diameter of about 1 nm to about 100 nm. According to another embodiment, the nanoperovskite has a diameter of about 20 nm to about 50 nm. According to another embodiment, the nanoperovskite is a distorted nanoperovskite. According to another embodiment, the nanoperovskite is of a cryolite perovskite structure. According to another embodiment, the silver oxyfluoride compound further comprises a conductive matrix. According to another embodiment, the conductive matrix is a conductive matrix selected from the group consisting of $VO_2$, $MoO_2$, $MoO_3$, $V_2O_5$, $V_6O_{13}$, NiO, CuO, Ag, $Ag_2F$, a carbon fluoride, a molybdenum sulfide, a molybdenum oxysulfide, titanium sulfide, phosphates, tellurides, selenides, chromium oxide, and manganese oxide ($MnO_2$). According to another embodiment, the silver oxyfluoride compound comprises a partially substituted silver oxyfluoride compound. According to another embodiment, the partially substituted silver oxyfluoride compound comprises $Ag^{1+}{}_yMe^{n+}{}_1O^{2-}{}_xF^{1-}{}_z$, wherein $0.75<y<10$; $x>0$ and $z>0$; $2x+1z=y+n$; $2<n^+<6$; where Me is a partially substituted component consisting of $Me_{1-w}$, where $(1-w)=100\%$ of the partially substituted component consisting of $Me_{1-w}$, (w) refers to percentage of substituted of Me, and (w) is less than 50%. According to another embodiment, 1<y<5. According to another embodiment, 3<y<5. According to another embodiment, y=3. According to another embodiment, x=z. According to another embodiment, Me is a transition metal. According to another embodiment, Me is a first row transition metal. According to another embodiment, Me is a second row transition metal. According to another embodiment, Me is a metal selected from the group consisting of Bi, Cu, Mo, V, Nb, or any mixture thereof, and w is not 0. According to another embodiment, the partially substituted Me component $Me_{1-w}$, is partially substituted with atoms selected from the group consisting of V, Ti, Cr, Mn, Fe, Co, Ni, Cu, $Ag^{2+}$ and Ga. According to another embodiment, the partially substituted silver oxyfluoride compound comprises a nanoperovskite structure. According to another embodiment, the nanoperovskite has a diameter of about 1 nm to about 100 nm. According to another embodiment, the nanoperovskite has a diameter of about 20 nm to about 50 nm. According to another embodiment, the nanoperovskite is a distorted nanoperovskite. According to another embodiment, the nanoperovskite is a cryolite perovskite structure. According to another embodiment, the partially substituted silver oxyfluoride compound further comprises a conductive matrix. According to another embodiment, the conductive matrix is a conductive matrix selected from the group consisting essentially of $VO_2$, $MoO_2$, $MoO_3$, $V_2O_5$, $V_6O_{13}$, NiO, CuO, carbon fluorides, Ag, $Ag_2F$, molybdenum sulfides, phosphates, tellurides, selenides, molybdenum oxysulfides, titanium sulfide, chromium oxide, manganese oxide. According to another embodiment, the partially substituted silver oxyfluoride compound is used in an electrode of a rechargeable battery. According to another embodiment, the electrochemical cell further comprises an electrolyte.

DETAILED DESCRIPTION OF THE INVENTION

Figure 1:
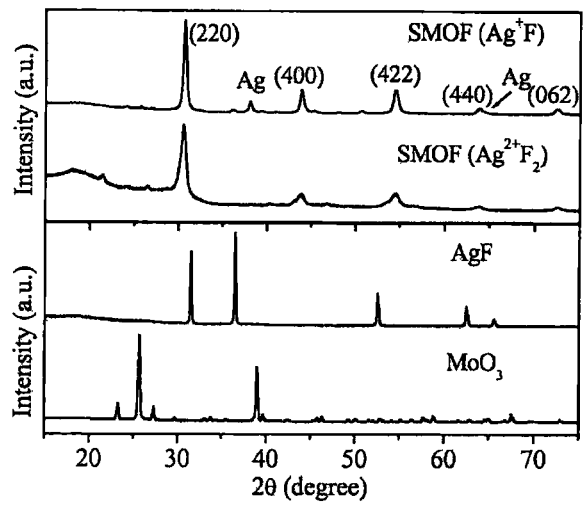
FIG. 1(a) shows X-ray powder diffraction patterns of silver molybdenum oxyfluoride perovskite fabricated by high-energy milling 75 mol % $Ag^{1+}F$ or $Ag^{2+}F_2$ and 25 mol % $MoO_3$ for 45 minutes (top half of figure) compared to the reagents utilized (lower half of figure).
FIG. 1(b) shows lattice parameter of SMOF perovskite as a function of the precursors $Ag^{1+}F$ and $Ag^{2+}F_2$.
Figure 1:
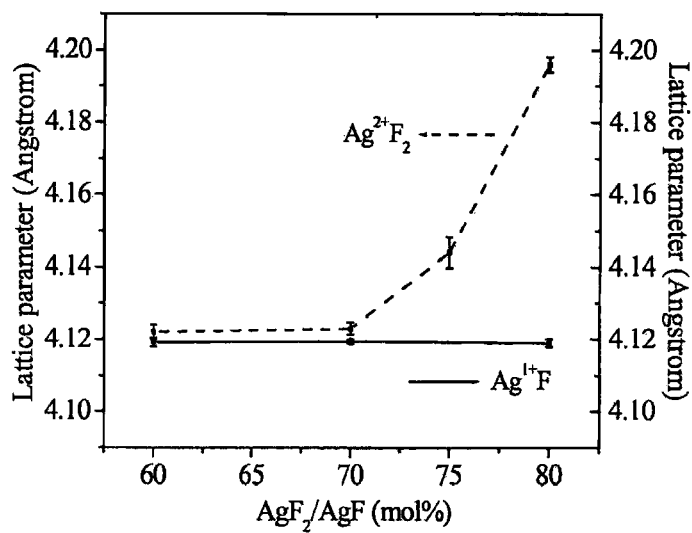

The present invention provides improved materials for battery components, specifically for electrodes in primary and rechargeable battery cells.

As used herein, the term "SMOF" refers to silver molybdenum oxyfluoride.

As used herein, the term "SNOF" refers to silver niobium oxyfluoride.

As used herein, the term "specific volumetric capacity" refers to the amount of energy in milliamp hours (mAh) per cubic centimeter (cc).

As used herein, the term "perovskite" refers to a group of crystals whose basic chemical formula follows the pattern $ABX_3$, where A and B are cations of different sizes, and where the crystal may or may not be of nanoparticle size. As used herein, the term "ideal" perovskite refers to a perovskite having a structure in which A (cation) is located at the center of the cubic unit cell, B (cation) is located at each corner and anions (oxygen or fluorine) are located at the center of each side. As used herein, the term "perovskite" includes the structures of: the classical perovskite structure $ABX_3$ where A is Ag, B is a metal, and X consists of oxygen and fluorine; distorted $ABX_3$ perovskite; ordered perovskite such as elpasolite ($A_2BB'X_6$) and cyrolite ($A_3BX_6$) derivatives; layered perovskite (Ruddlesden-Popper $A_{n+1}B_nX_{3n+1}$); Dion-Jacobson ($A'[A_{n-1}B_nX3^{n+1}]$); Aurivillius ($A'_2A_{n-1}B_nX_{3n+13}$; $A_nB_nX_{3n+2}$); and other perovskite structures as recognized by those skilled in the art (see, for example, Mitchell, R. *Perovskites, Modern and Ancient*. Almaz Press Inc., Ontario, Canada, 2002). In most cases the materials discussed herein are related to the non-ideal perovskite structures. The term "nanoperovskite" as used herein refers to a perovskite of nanoparticle size.

As used herein, the term "crystal" refers to a homogenous solid formed by a repeating, three-dimensional pattern of atoms, ions, or molecules and having fixed distances between constituent parts or the unit cell of such a pattern. As used herein, the term "crystal structure" refers to the arrangement or formation of atoms or ions within the crystal.

As used herein, the terms "nanocrystallite" and "nanoparticle" are used interchangeably and refer to crystallites of about 100 nm to about 1 nm in size. As is well known in the art, crystallite size may be determined by common methodologies such as peak breadth analysis in X-ray diffraction (XRD) and high resolution transmission electron microscopy (HRTEM).

As used herein, the term "silver oxyfluoride compound" includes any combination that comprises the elements of silver (Ag), fluoride (F), oxygen (O), and, optionally, a second metal (Me), incorporated within a perovskite structure, which may or may not be of nanocrystallite size. The term "nanocrystallite" as used herein refers to a discrete crystallite <100 nm in size or a crystallite <100 nm in size incorporated into a matrix resulting in the formation of a nanocomposite. The final nanocomposite may or may not be of sizes greater than 100 nm. The term "elements" as used herein refers to simple substances which cannot be resolved into simpler substances by normal chemical means.

According to another aspect of the present invention, the silver oxyfluoride compound is of the formula $Ag^{1+}_yMe^{n+}_1O^{2-}_xF^{1-}_z$. According to some such embodiments, Me is a metal selected from the group consisting of Bi, Cu, Mo, V, Nb, and any mixture thereof. According to some such embodiments, 0.75<y<10. According to some such embodiments, 1<y<5. According to some such embodiments, 3<y<5. According to some such embodiments, y=3. According to some such embodiments, x=z. According to some such embodiments, x>0 and z>0. According to some such embodiments, 2x+1z=y+n. According to some such embodiments, $2<n^+<6$.

According to some embodiments, the present invention provides a composition including a silver oxyfluoride compound demonstrating a specific volumetric capacity from about 400 mAh/cc to about 900 mAh/cc at a voltage of about 2.0 V to about 4.0 V when compared to a Li/Li+ reference potential. According to some such embodiments, the demonstrated volumetric capacity is from about 550 mAh/cc to about 800 mAh/cc.

According to some embodiments, the specific capacity of the silver oxyfluoride compound is reversible. The term "specific capacity" as used herein refers to the amount of energy the silver oxyfluoride compound contains in milliamp hours (mAh) per unit weight. As used herein, the term "reversible specific capacity" means that the silver oxyfluoride compound of the present invention may be recharged by passing a current through it in a direction opposite to that of discharge.

According to some embodiments, the silver oxyfluoride compound includes perovskite crystallites that are less than 100 nm in diameter. According to some such embodiments, the silver oxyfluoride compound includes perovskites that are less than about 50 nm in diameter. According to some such embodiments, the silver oxyfluoride compound includes perovskites that are less than about 20 nm in diameter. According to some such embodiments, the silver oxyfluoride compound includes perovskites that are about 1 nm in diameter.

According to some embodiments, the silver oxyfluoride compound further includes a second metal, meaning a metal other than Ag. One of skill in the art can readily identify metals for use in silver oxyfluoride compound of the present invention. Such metals include, but are not limited to, non-transition metals and transition metals. Examples of transition metals include first row transition metals and second row transition metals. Specific examples of metals for use in silver oxyfluoride compound of the present invention include, but are not limited to, Bi, Mo, Cu, V and Nb, and mixtures thereof. According to some such embodiments, the second metal is Mo or Nb.

According to some embodiments, the second metal may be partially substituted with a metal cation. As used herein, the term "partially substituted" refers to a condition where an alternative cation is placed within the atomic crystal structure of the second metal. For example, a silver oxyfluoride compound, where the second metal (Me) is partially substituted, may have the formula $Ag^{1+}{}_y Me^{n+}{}_1 O^{2-}{}_x F^{1-}{}_z$ where the Me component is further represented as $Me_{1-w}$, where (1-w)= 100% or the value 1 of the Me component, and (w) is the percentage of Me component substituted with a metal cation. When Me is partially substituted, (w) is less than 50% (0.5). When (w) is equal to zero (0), the Me is unsubstituted. Thus, for example, $Me_{1-0.4}$ would represent 40% partial substitution, with 60% of the Me remaining unsubstituted. According to some embodiments, $0.75 < y < 10$. According to some embodiments, $1 < y < 5$. According to some embodiments, $3 < y < 5$. According to some embodiments, $y = 3$. According to some embodiments, $x = z$. According to some embodiments, $x > 0$ and $z > 0$. According to some embodiments, $2x + 1z = y + n$. According to some embodiments, $2 < n^+ < 6$. According to some embodiments, charge compensation may be made by a change in charge of the metal cation or a change in anion content, such as loss of $F^-$ or gain of $O^{2-}$. Suitable metal elements having charges that may be included in the inventive crystalline silver oxyfluoride compound that can partially substitute charge of a second metal (Me) cation include, but are not limited to, non-transition metals, and transition metals. According to some embodiments, the suitable metal elements having charges that may be included in the inventive crystalline silver oxyfluoride compound that can partially substitute charge of a second metal (Me) cation include first row transition metals. Specific examples of such metals for use in the inventive composition include, but are not limited to, V, Ag, Ti, Cr, Mn, Fe, Co, Ni, Cu or Ga. It is desirable, but not required, that such compounds retain both electrical and ionic conductivity. According to some embodiments, less than 50% of the second metal (Me) is substituted with V, Ag, Ti, Cr, Mn, Fe, Co, Ni, Cu, or Ga. In the case of Ag, Ag may be in the divalent oxidation state.

The present invention also provides a composition of $AgF_2$-based mixed conductors for high energy density cathode materials to stabilize highly oxidative $Ag^{2+}$ in a matrix or framework of the mixed conductors and enable the electrochemical activity of the high voltage $AgF_2$. Although the electrochemical activity of $AgF_2$ potentially may be increased by decreased crystallite size and by the presence of the electronically conductive Ag metal, electron transport difficulties still prevail in the electrically disconnected and high band gap $AgF_2$ because the high oxidation state of $Ag^{2+}$ excludes the use of highly conducting carbon in the active cathode materials, and the addition of carbon (<2 g/cc) will unfavorably sacrifice the volumetric energy density of the batteries. It would be ideal that the additive can combine much better electronic conductivity and high volumetric energy density. In order to improve the conductivity of the $AgF_2$ or silver oxyfluoride perovskites, various conductive matrices may be utilized in order to allow transport of electrons and/or ions to the individual silver oxyfluoride crystallites. The term "conductive matrix" as used herein refers to a matrix that includes conductive materials, some of which may be ionic and/or electronic conductors. Materials in which the matrix retains both ionic and electronic conductivity commonly are referred to as "mixed conductors." Suitable conductive matrices include, but are not limited to, $VO_2$, $MoO_2$, NiO, $MoO_3$, molybdenum sulfides, molybdenum oxysulfides, titanium sulfide, phosphates, tellurides, selenides, $Ag_2F$, carbon fluorides, $V_2O_5$, $V_6O_{13}$, CuO, $MnO_2$, and chromium oxides. The highly metallic $Ag_2F$ phase was observed to form in-situ when SMOF fabricated by high-energy milling 85 AgF: $MoO_3$ (mol %) for 45 minutes was annealed in Ar atmosphere. It is very promising to use $Ag_2F$ phase as the conducting agent as it is dense (8.76 g/cc), and exhibits excellent electronic conductivity with the metallic character due to its unique layered structure. $Ag_2F$ has an anti-$CdI_2$ layered structure consisting of hexagonal close packed arrays of Ag and F atoms. In the layered $AgF_2$ crystal structure, the distance (2.84 Å) between the Ag atoms is smaller than that in metallic silver (2.88 Å) and the distance between Ag and F atoms is similar to that in AgF (Sun F., et al., *Journal of the Physical Society of Japan*, 55(2):461. 1986).

According to some embodiments, the silver oxyfluoride compound includes from about 1 to about 50 weight % of a conductive matrix. According to some embodiments, the silver oxyfluoride compound includes about 1 to about 25 weight % of a conductive matrix. According to some embodiments, the silver oxyfluoride compound includes from about 2 to about 15 weight % of a conductive matrix. According to some embodiments, the silver oxyfluoride compound and conductive matrix are in stoichiometric amounts.

According to one embodiment, the conductive matrix is carbon. According to some such embodiments, less than 50 weight percent of carbon is used. According to some such embodiments, less than 25 weight % is used. According to some such embodiments, less than 5 weight % of carbon is used. According to some embodiments, the conductive matrix is $Ag_2F$. According to some embodiments, the conductive matrix is a metal oxide, sulfide, phosphate, selenide, telluride, selenium or tellurium. According to some such embodiments, the metal of the metal oxide is Fe, B, Bi, Co, Ni, Mn, V, Mo, Pb, Sb, Cu, Sn, Nb, Cr or Zn.

The silver oxyfluoride compound of the present invention have a crystallite size of about 1 nm to about 100 nm in diameter. According to some such embodiments, the crystallite size is about 1 nm to about 50 nm in diameter. According to some such embodiments, the crystallite size is about 1 nm to about 30 nm in diameter. According to some such embodiments, the crystallite size is about 1 nm to about 15 nm in diameter.

Generally, as used herein, solution, gel, or high-energy impact milling techniques are referred to as "silver oxyfluoride compound fabrication methods."

The silver oxyfluoride compound of the present invention may be prepared by extreme, high impact-energy milling of a mixture that includes a silver fluoride compound and a compound such as $MoO_3$ or $Nb_2O_5$. Thus, the silver oxyfluoride compound of the present invention can be prepared by using a high energy impact mixer/mill, such as the commercially available SPEX 8000 device (SPEX Industries, Edison N.J., USA). Unlike the shearing action of conventional planetary, roller, or ball mills, which at best may allow for size reduction of crystalline particles to the micrometer range, the extremely high-energy impact action impressed upon the component mixture by the impact mill provides, within milling periods as short as about 10 minutes, a particle size reduction of the processed material to the nanostructure range of less than about 100 nm. Further milling for as little as 30 minutes up to about 4 hours brings about crystallite-particle size reduction to less than about 40 nm.

As used herein, the term "mechanochemical reaction" refers to the process of high-energy ball milling, for a predetermined time, of starting materials to facilitate the synthesis of a chemical composition. Generally, the starting materials are precursor chemical components provided in stoichiometric amounts.

Other methods may be used to form the silver oxyfluoride compound of the present invention. As will be evident to a skilled artisan, solution or gel techniques may be used to fabricate the silver oxyfluoride compound.

When silver fluoride is milled with another component, the silver fluoride undergoes chemical changes such that its X-ray diffraction (XRD) characteristics take on the character of a new, highly electrochemically active material, although retaining major electrochemical aspects of the silver fluoride. Perovskite formation may be characterized easily by well known methods such as XRD, transmission electron microscopy, or Raman spectroscopy.

According to one embodiment, milling occurs for about 45 minutes to obtain nanocrystalline silver oxyfluoride compounds. According to some such embodiments, the nanocrystalline form is a nanoperovskite. According to some such embodiments, the nanoperovskites are conductive. To enhance the density and connectivity of the nanocrystallites without affecting nanocrystallinity, brief thermal annealing or sintering aids may be utilized.

According to another embodiment, the silver oxyfluoride compound demonstrates a conversion reaction. As used herein, the term "conversion reaction" refers to decomposition reactions in which the silver oxyfluoride compound is fully reduced during battery cell discharge to $Ag^0$ with the concomitant formation of a lithium, magnesium or calcium compound.

According to another embodiment, the conversion reaction of the silver oxyfluoride compound is reversible. As used herein, the term "reversible conversion reaction" refers to a reaction in which the silver oxyfluoride compound is capable of reforming during a battery cell charge.

According to another aspect of the present invention, an electrochemical cell, such as, for example, a primary or rechargeable battery cell, is provided, which employs the inventive silver oxyfluoride compound as the cathode material. The cell may be prepared by any known method. The inventive silver oxyfluoride compound electrode (cathode) materials function well with most other known primary or secondary cell composition components, including polymeric matrices and adjunct compounds, as well as with commonly used separator and electrolyte solvents and solutes. For example, electrolyte compositions commonly used in known rechargeable electrochemical-cell fabrication serve equally well in the cells of the present invention. These electrolyte compositions may include one or more metallic salts, such as, but not limited to, lithium, magnesium, calcium, zinc, manganese, and yttrium. Lithium salts, such as $LiPF_6$, $LiBF_4$, $LiClO_4$, and the like, dissolved in common cyclic and acyclic organic solvents, such as ethylene carbonate, dimethyl carbonate, propylene carbonate, ethyl methyl carbonate, and mixtures thereof, may be used. As with optimization of the silver oxyfluoride compound of the present invention, specific combinations of electrolyte components will be a matter of preference of the cell fabricator and may depend on an intended use of the cell, although consideration may be given to the use of solutes such as $LiBF_4$, which appear less susceptible during cell cycling to hydrolytically forming HF, which could affect the optimum performance of some metal fluorides. For such reason, for instance, a $LiBF_4$:propylene carbonate electrolyte may be preferred over one comprising a long-utilized standard solution of LiPF6 in a mixture of ethylene carbonate:dimethyl carbonate.

In addition, the silver oxyfluoride compound composites of the present invention may be incorporated into solid state polymer cells utilizing solid state ionically conducting matrices derived from compounds such as polyethylene oxide (PEO). The silver oxyfluoride compound of the present invention also may be fabricated by thin film deposition techniques and may be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes, or $C_{60}$, and lithiated metal nitrides. The negative electrode members of electrochemical cells also may further include either a magnesium-, calcium-, zinc-, manganese-, or yttrium-based negative electrode.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Synthesis of Silver Molybdenum Oxyfluoride (SMOF)

Commercially available $MoO_3$ (Alfa Aesar, 99.5%) and $AgF_2$ (Aldrich, 98+%) or AgF (Aldrich, 99%) were utilized as starting materials. One gram pre-ground stoichiometric precursor powders were high-energy milled for the designated time (45 minutes), using an Spex 8000 Certiprep mixer/mill. All assemblies were performed in a He-filled (−80° C. dewpoint) glove box.

Example 2

Physical Characterization (X-ray Powder Diffraction and Raman Spectroscopy)

Example 2.1

X-Ray Powder Diffraction

X-ray powder diffraction (XRD) was conducted on a Scintag X2 diffractometer with Cu Kα radiation at 0.6°/min in the 2θ range of 15° to 80°. The materials were covered by Kapton film and sealed on a sample holder (The Gem Dugout) made from Si (510) orientation by a layer of vacuum grease around the perimeter to minimize contamination by air or moisture. XRD patterns for Rietveld refinement were recorded by step scans (step size: 0.03°, exposure: 20 sec) between 15° and 80°. Characterization of the structure of SMOF was performed with the assistance of CaRine v3.1 and MDI Jade v8.0.

Mechanochemical fabrication via milling x AgF or $AgF_2$: (1-x) $MoO_3$ (mol %) mixtures eliminated the initial reactants AgF or $AgF_2$ and $MoO_3$. This contrasts with reports that high-energy milling $CuF_2$ and $MoO_3$ mixtures resulted in the formation of a nanocomposite with $CuF_2$ nanodomains embedded in the metal oxyfluoride matrices (Badway, F., et al., *Chem. Mater.*, 19, 4129, 2007). A new cubic phase was indicated by new Bragg reflections that developed around 2.908 Å, 2.061 Å, 1.682 Å, and 1.458 Å within a wide composition range x(AgF or $AgF_2$):(1-x) $MoO_3$ where x is about 60 molar % to about 80 molar %. This is consistent with the formation of a perovskite of $Ag_3MoO_3F_3$ composition.

FIG. 1(a) shows the XRD patterns of an almost pure new cubic phase fabricated by high-energy milling 75 mol % AgF or $AgF_2$ and 25 mol % $MoO_3$ for 45 min. The structure of this new cubic phase was initially characterized as a cubic perovskite and is consistent with the formation of a perovskite of $Ag_3MoO_3F_3$ composition of the perovskite cryolite structure (with the assistance of XRD modeling via CaRine v3.1). FIG. 1(b) shows that the lattice parameter of as-fabricated SMOF increased with increasing content of $AgF_2$ relative to AgF. Small reflections related to Ag metal were observed in samples prepared with AgF; in contrast, very few Bragg reflections related to a second phase were observed for the samples prepared with $AgF_2$. Without being limited by theory, this lattice expansion may be due to the substitution of larger $Ag^{1+}$ (1.26 Å) for $Mo^{6+}$ (0.62 Å) and/or the likely parallel reduction of $Mo^{6+}$ (0.62 Å) to $Mo^{4+}$ (0.7 Å). The parallel reduction of $Mo^{6+}$ (0.62 Å) to $Mo^{4+}$ (0.7 Å) could result on its own due to the high fluorination power of $AgF_2$.

Figure 2:
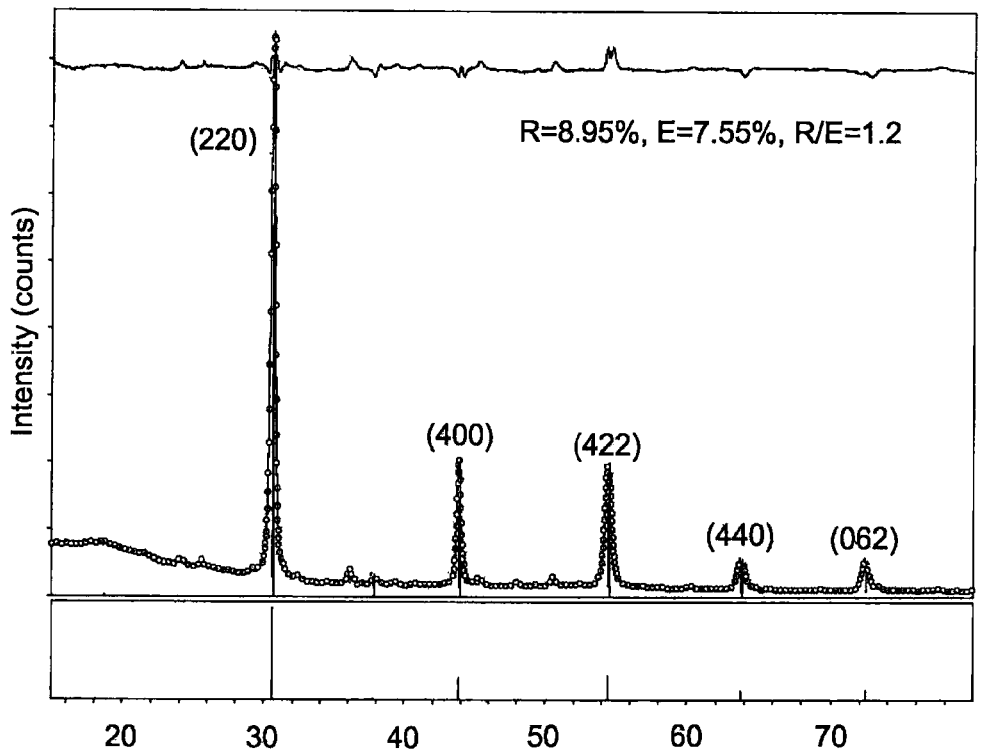
FIG. 2 shows the observed (circles) and calculated through Reitveld refinement (continuous line) X-ray diffraction profiles of SMOF perovskite refined to a cryolite type perovskite structure. The overlaying vertical lines indicated the expected Bragg reflections. The difference plot, $I_{obs}-I_{calc}$, is shown at the top.

The perovskite structure of the as-fabricated SMOF was confirmed by Rietveld refinement. FIG. 2 shows a good fit between the observed X-ray diffraction pattern (circled) and the calculated profile (continuous line) as indicated by R factors (R=8.95%, E=7.55%, R/E=1.2).

Both tolerance and octahedral factors are important for a stable perovskite structure. Tolerance factors ($t=(r_A+r_X)/\sqrt{2}(r_B+r_X)$, where $r_A$, $r_B$ and $r_X$ are the radii of A, B and X ions) indicate how far from ideal cubic packing can be tolerated by the perovskite structure ($ABX_3$). Octahedral factors ($r_B/r_X$, where $r_B$ and $r_X$ are the radii of B and X ions) show the stability of the octahedron $BX_6$, and thus the stability of perovskite structure. More specifically, the modified Goldschmidt's tolerance factor t is described as $t=\sqrt{2}(r_A+r_X)/(r_A+r_B+2r_X)$, where $r_A$, $r_B$ and $r_X$ are the radii of A, B and X ions for the crylite-type structure. The tolerance factor (t=0.81) of the SMOF cryolite composition falls within the stable range (about 0.8 to about 1.0) of stable cubic cryolite $A_3BX_6$ (See Flerov, I. N., et al., Materials Sci & Eng. 24: 41, 1998). Cubic cryolite-type structure $A_3BX_6$ is a particular case of the elpasolite structure $A_2BB'X_6$ (ordered perovskite $ABX_3$), in which A and B atoms are chemically identical. Therefore, the modified Goldschmidt's tolerance factor also is very important to define the stability of cubic cryolite-type structure. In addition, the cryolite-type SMOF satisfied the radius ratio rule as suggested in the previous literature (See Flerov, I. N., et al., Materials Sci. and Eng., 24: 81, 1998): (1) $R_A>0.73 R_X$ (2) $0.41 R_X \leq R_B \leq R_A-0.13 R_X$; (3) $R_A>R_B$.

Example 2.2

Raman Spectroscopy

Raman spectra in the range of about 100 cm$^{-1}$ to about 2000 cm$^{-1}$ were collected with an Enwave EZRaman-L series Raman system with excitation light of a laser at 670 nm wavelength (Enwave Optronics, Inc.). SMOF materials were sealed in a house-made cell with a quartz window under a He atmosphere.

Crystals with perovskite structure have been intensively investigated. It is well known that the perovskite structure ABX$_3$ is composed of a framework of BX$_6$ octahedrons. According to the G and F matrix elements of the octahedral BX$_6$ molecule, only vibrations of $v_1$ (A$_{1g}$), $v_2$ (E$_g$) and $v_5$ (F$_{2g}$) are Raman-active (K. Nakamoto, *Infrared and Raman Spectra of Inorganics and Coordination Compounds*, John Wiley & Sons, Inc., p. 214, New York (1997)). This is consistent with the former Raman studies on the perovskite compounds ABX$_3$ (Maczka, M., et al., *J. Phys. Condens. Matter*, 16, 2297, 2004), in which four Raman-active peaks were observed around 800 cm$^{-1}$, 600 cm$^{-1}$, 400 cm$^{-1}$, and lower frequency. These bands were respectively assigned to the symmetric breathing of oxygen octahedrons (A$_{1g}$), asymmetric breathing of oxygen octahedrons (E$_g$), bending of oxygen octahedrons (F$_{2g}$), and displacement of A cation (F$_{2g}$), respectively. Raman studies on the cubic cryolite (NH$_4$)$_3$ScF$_6$ indicated three Raman-active free ion vibration frequencies $v_1$ (A$_{1g}$), $v_2$ (E$_g$) and $v_5$ (F$_{2g}$) at 498 cm$^{-1}$, 390 cm$^{-1}$ and 230 cm$^{-1}$ in the spectral region including internal vibrational modes of the ScF$_6$ molecule ions (See A. N. Vtyurin et al., *Physics of the Solid State*, 43 (12), 2001, 2307). In addition, a lattice-phonon line associated to the translational vibration of the N$_4^+$ is identified with the weak and broad peak near 150 cm$^{-1}$. By combination with the aforementioned Raman analysis, the bands at 315 cm$^{-1}$, 380 cm$^{-1}$ and 600 cm$^{-1}$ observed in the Raman spectra of as-fabricated SMOF can be assigned unambiguously to the F$_{2g}$ mode related to the displacement of Ag cation on A sites, F$_{2g}$ due to bending of oxygen/fluorine octahedrons and E$_g$ associated to asymmetric breathing of oxygen/fluorine octahedrons. For the sake of clarity, these three Raman peaks in the relatively low frequency region are not shown.

Figure 3:
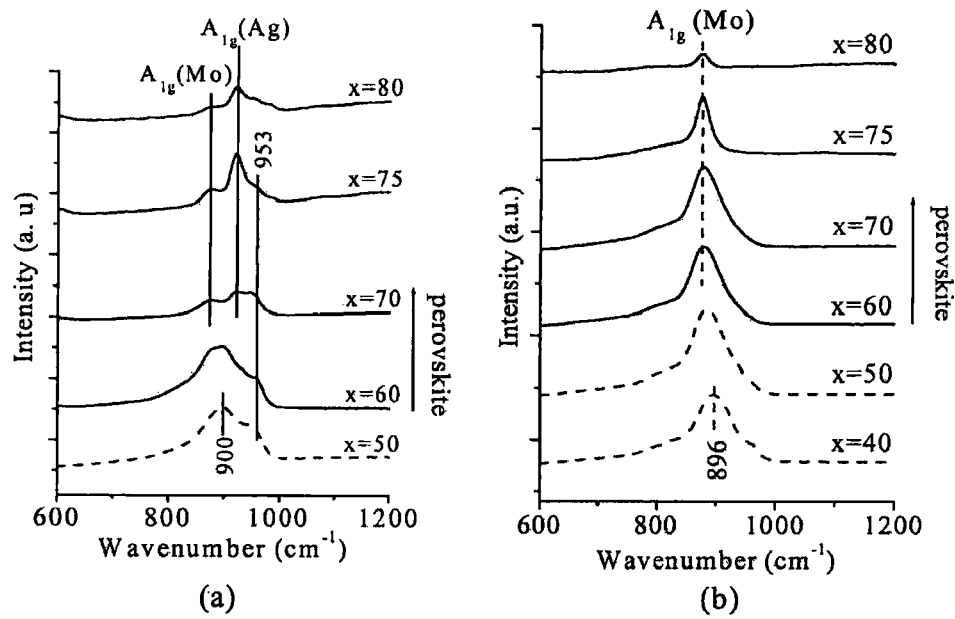
FIG. 3 shows Raman spectra of SMOF perovskites prepared by high-energy milling a) x $Ag^{2+}F_2$: (1-x) $MoO_3$; b) x $Ag^{1+}F$: (1-x) $MoO_3$ for 45 minutes.

As for the A$_{1g}$ mode, FIG. 3 shows that several Raman peaks (925 cm$^{-1}$, 876 cm$^{-1}$ and 900 cm$^{-1}$) are observed in the region of about 800 cm$^{-1}$. The 876 cm$^{-1}$ peak always developed with the formation of the SMOF perovskite phase as shown by XRD data. Therefore, this 876 cm$^{-1}$ band is believed to be characteristic of the SMOF perovskite and is assigned to the symmetric breathing of Mo octahedrons. It is of interest to note that the 926 cm$^{-1}$ peak is present in the Raman spectra of SMOF fabricated by Ag$^{2+}$F instead of Ag$^{1+}$F.

Example 3

Electrochemical Characterization

The electrochemical properties of SMOF perovskites were investigated by using 2025 coin cells, which contain SMOF as a cathode and Li (Johnson Matthey) as an anode. A layer of Celgard separator and Whatman GF/D glass fiber separators were saturated in the electrolyte consisting of 1 M LiPF$_6$ in ethylene carbonate: dimethyl carbonate (EC:DMC, 1:1 by volume) (Merck). All the cells were assembled in a He-filled glove box and cycled at constant current 7.58 mA/g between 4-2 V at 22° C. on a MacPile galvanostat cycler (Biologic, Claix, France) unless otherwise noted. A SMOF cathode was introduced in three forms: (1) pure SMOF powder, (2) manually mixed 80% SMOF, 10% carbon and 10% poly(vinylidene fluoride-co-hexafluoropropylene) (Kynar 2801, ElfAtochem) binder, and (3) SMOF tape prepared by casting the slurry consisting 57% SMOF, 12% carbon and 31% poly (vinylidene fluoride-co-hexafluoropropylene) binder.

Example 3.1

Figure 4:
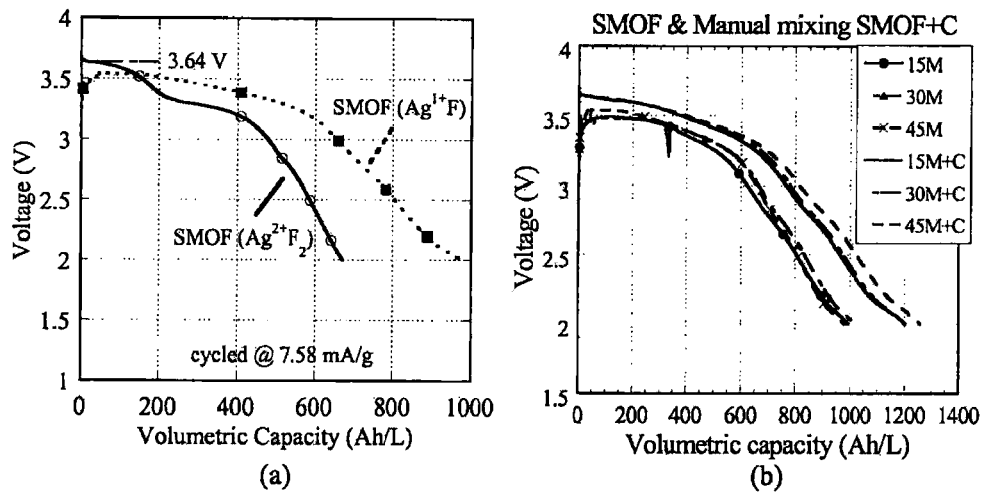
FIG. 4(a) shows voltage profiles of SMOF powder fabricated using both $Ag^{1+}F$ and $Ag^{2+}F_2$ precursors.
FIG. 4(b) shows voltage profiles of SMOF powder indicating the effects of high-energy milling time and carbon. Labels indicate high-energy milling time.

Electrochemical Properties of SMOF Perovskites without the Presence of Carbon Conductive Matrix The electrochemical properties of SMOF perovskites were investigated by testing relatively pure SMOF powder versus Li. FIG. 4(a) shows that the SMOF perovskites fabricated with AgF and AgF$_2$ have electro activity without the presence of a carbon conductive matrix. This suggests that the as-fabricated SMOF perovskites have very good mixed conductivity. It also suggests, without being limited by theory, that the SMOF perovskites may be appropriate for high volumetric density applications where the presence of carbon matrix is detrimental to the overall volumetric energy density. With respect to the better electrochemical performance of SMOF AgF (output voltage of ~3.5 V and volumetric capacity of ~1000 Ah/L) when compared with SMOF AgF$_2$, the SMOF perovskite fabricated with AgF is more stable.

Preliminary optimization of SMOF electrochemical performance was focused on SMOF prepared by AgF. FIG. 4(b) shows the effects of high-energy milling time and carbon on such SMOFs. The addition of a carbon matrix caused little improvement in the electrochemical performance relative to pure SMOF powder.

Example 3.2

Figure 5:
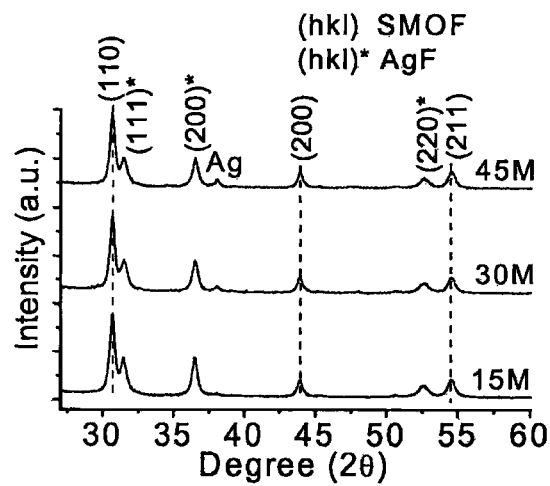
FIG. 5(a) shows XRD patterns of SMOF fabricated by high-energy milling 85 mol % AgF: 15 mol % $MoO_3$ for 15 mins, 30 mins and 45 mins in He atmosphere.
FIG. 5(b) shows voltage profile of a SMOF+C tape for in-situ XRD. SMOF was prepared by high-energy milling 70 mol % AgF: 30 mol % $MoO_3$ for 45 mins. The cell was cycled at 3 mA/g.
Figure 5:
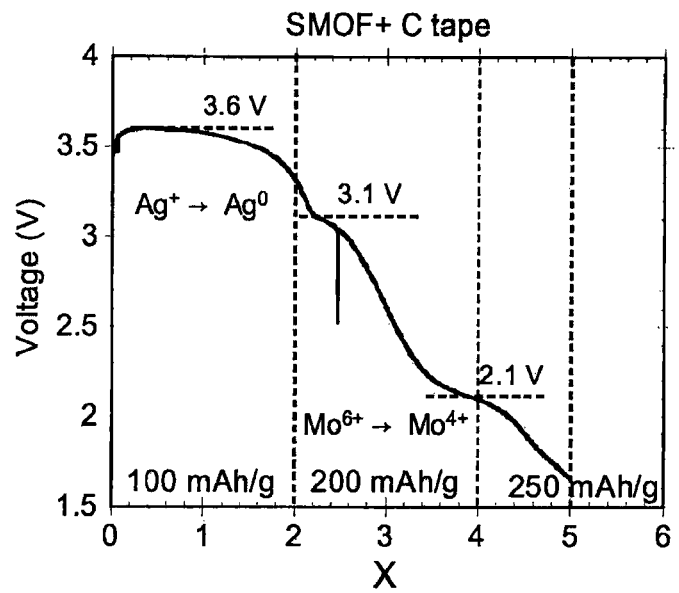

Different High-Energy Milling Durations Result in Little Change in Voltage Profiles of SMOF Perovskites Different durations of high-energy milling resulted in little change in the voltage profiles of SMOF perovskites, which is consistent with the SMOF phase evolution indicated by XRD as shown in FIG. 5(a). The SMOF perovskite fully developed at 15 minutes. Further increasing the high-energy milling time did not cause peak shifting and broadening, indicating no effect on the crystalline size and intrinsic core structure. At 45 minutes, a small amount of Ag metal is observed, which is expected to improve the electronic conductivity of the cathode without affecting the overall electrochemical performance.

FIG. 5(b) shows the first discharge voltage profile of a SMOF+C electrode composite. Three plateaus at 3.6, 3.1 and 2.1 V and almost the theoretical specific capacity (150 mAh/g for 3 e$^-$ transfer) of SMOF were achieved, based on the assumed composition of Ag$^+_3$Mo$^{6+}$ (O$_3$F$_3$). The first 3 e$^-$ transfer was observed at the first plateau with the output voltage 3.6-3.1 V, and the fourth and fifth e$^-$ transfer occurred in the region 3.1 to 2 V. Without being limited by theory, since the output voltage 3.6 V at the first plateau is consistent with the theoretical voltage of Ag$^+$F reduction to Ag metal, and although the existence of Li$^+_3$Mo$^{6+}$(O$_2$F$_3$) is not confirmed, the reaction at the first plateau (>3 V) may be:

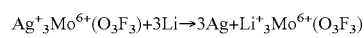

$$Ag^+_3Mo^{6+}(O_3F_3)+3Li \rightarrow 3Ag+Li^+_3Mo^{6+}(O_3F_3) \quad [1]$$

Example 3.3

Identification of Discharge Reaction Mechanism of SMOF

Figure 6:
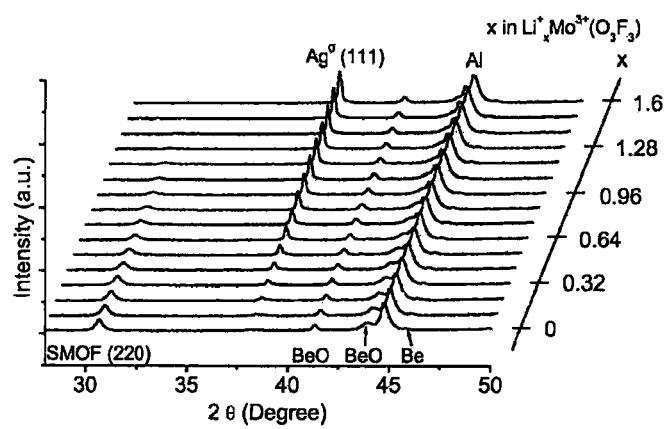
FIG. 6 shows in situ XRD of a SMOF+C tape in the region (a) x=0–1.6; (b) x=1.5–5 based on $Li_xAg_3Mo(O_3F_3)$. SMOF was prepared by high-energy milling 70 mol % AgF: 30 mol % $MoO_3$ for 45 mins.
Figure 6:
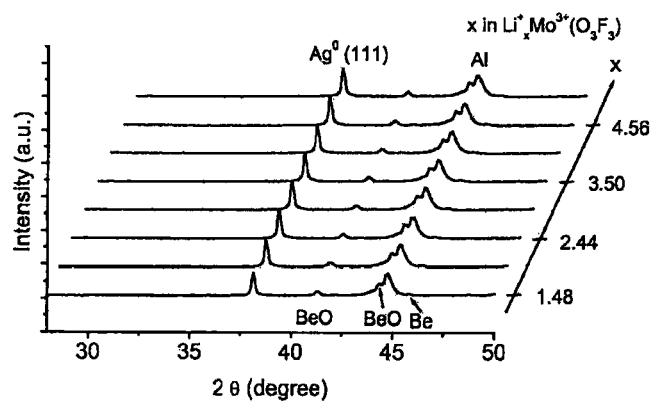

Lithium insertion into SMOF was investigated by in situ XRD to identify the discharge reaction mechanism of SMOF. FIG. 6(a) shows that the perovskite (220) peak decreases in intensity as x in $Li^+$ increases from 0 to 1.4. This decrease in the SMOF (220) peak intensity is offset by an increase in intensity of the Bragg peak related to $Ag^0$ (111). For x>1.4, there is little change in the intensity of the $Ag^0$ (111) peak (see FIG. 6(b)). Without being limited by theory, this is consistent with displacement, or possible conversion, of SMOF to Ag metal upon lithium insertion at the first plateau (>3 V).

In summary, the present invention describes synthesis of an electroactive SMOF of proposed composition $Ag^{1+}_3Mo^{6+}(O_3F_3)$ by a very fast mechanochemical reaction through the use of $AgF/AgF_2$ and $MoO_3$ precursors. The attractive electrochemical performance attributes of the unstable and insulative $AgF_2$ and AgF were realized by this new perovskite. Its very good conductivity and transport leads to an overall volumetric energy density of about 4000 Wh/L in the region of about 4V to about 2 V, which is comparable to that of silver vanadium oxide SVO (4000 Wh/L), today's state of the art in the biomedical community. Further, the SMOF exhibited a very high volumetric energy density of 2666 Wh/L at the first plateau (>3 V) which is very superior to that of SVO (about 1400 Wh/L).

Example 4

Alternative Compositions Relating to the Perovskite Structure

Figure 7:
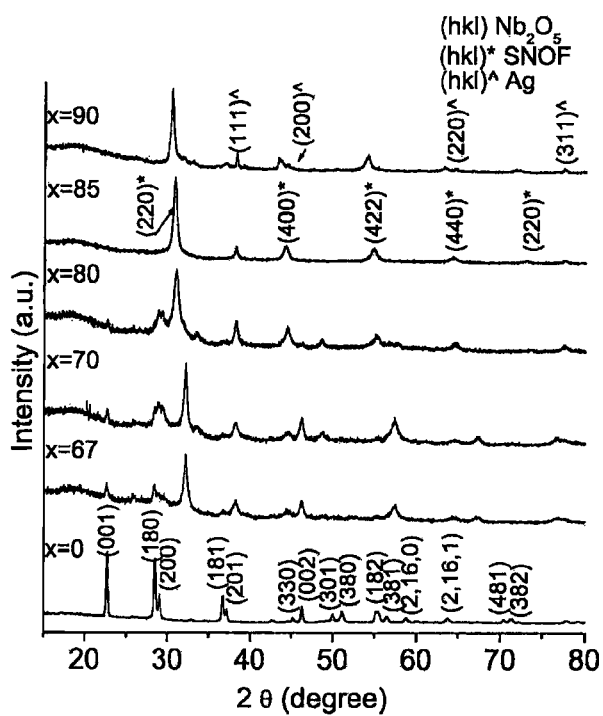
FIG. 7 shows XRD patterns of various $AgF:Nb_2O_5$ compositions after high energy milling. Label x indicates the AgF content.
Figure 8:
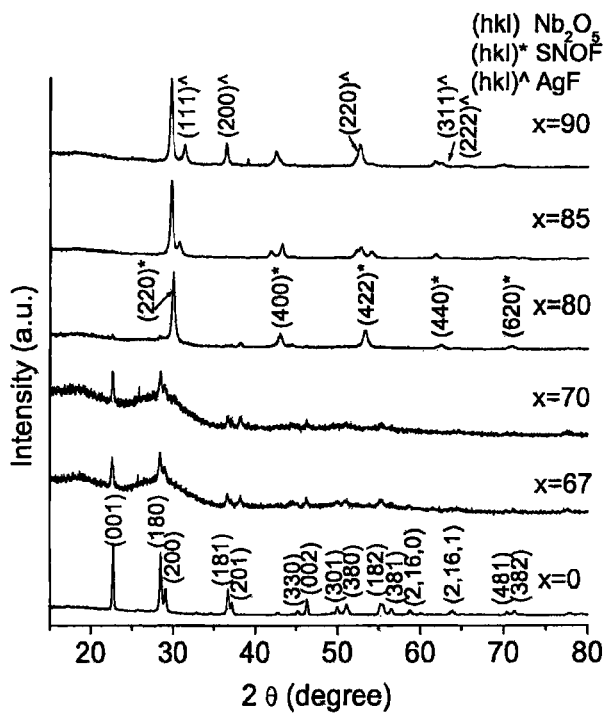
FIG. 8 shows XRD patterns of various $AgF_2$ $Nb_2O_5$ compositions after high energy milling. Label x indicates the $AgF_2$ content.

Compositions of AgF or $AgF_2$ and $Nb_2O_5$ were high energy milled in a similar fashion to that used to prepare the molybdenum based compounds discussed above. FIG. 7 and FIG. 8 show that above a critical amount of Ag, the high energy milling process resulted in the disappearance of the original reactants and the formation of new phases. These phases were found to develop for AgF reactants and for $AgF_2$ reactants, respectively.

For AgF reactants, compositions of x=0.67 and x=0.70 of $x(AgF_z) (1-x)Nb_2O_5$ resulted in the formation of a $Nb_2O_5$ residual phase along with peaks associated with a perovskite phase. Increasing the AgF content resulted in the purification of the composition, the removal of the $Nb_2O_5$ second phase, and the presence of peaks associated with a perovskite related phase shifting to lower d-spacings, indicating an increase in lattice parameters. Compositions of x=0.85 and x=0.90 resulted in a pure phase associated with the perovskite structure with a small amount of Ag second phase present. An increase in the AgF content resulted in the continued shift of the Bragg reflections associated with the perovskite phase to lower angles, indicating a continuous increase in the lattice parameter of the crystal structure.

Similar trends in the development of the crystal structure were observed for compositions prepared using $AgF_2$ as a reactant. Compositions of x=0.67 and x=0.70 resulted in a mostly x-ray amorphous crystal structure with identifiable small residual peaks relating to the $Nb_2O_5$ second phase. A $AgF_2$ composition of x=0.8 resulted in the distinct and sharp development of phase associated with the perovskite structure. This sample was exceptionally pure with very little second phase present. Further increase of the $AgF_2$ content resulted in the shift of the main Bragg reflections to smaller angles in a similar fashion to what was observed in the AgF samples, thereby indicating an increase in the lattice parameter. Satellite peaks develop in the 0.85 and 0.9 compositions that did not develop in the AgF based samples. Without being limited by theory, these may be due to a possible decrease in symmetry of the perovskite structure away from the basic cubic structure.

Figure 9:
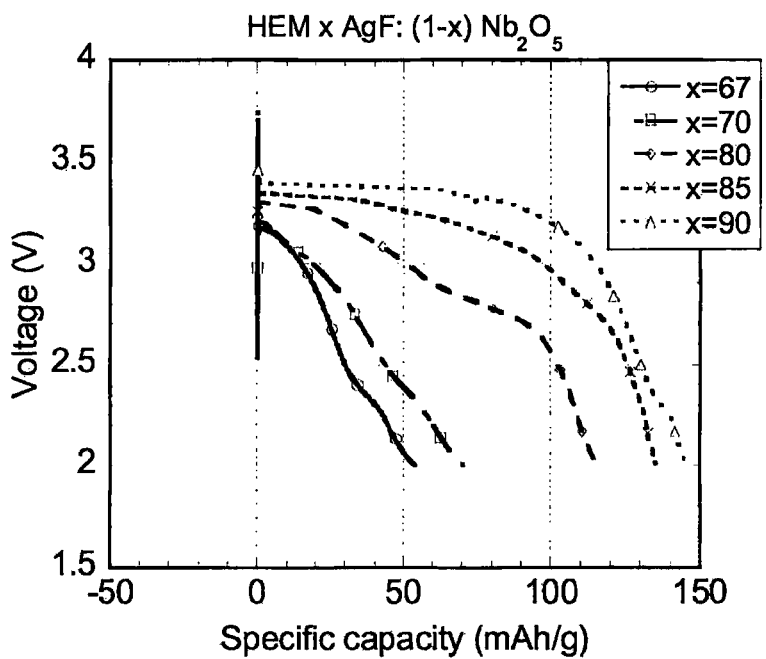
FIG. 9 shows the electrochemical discharge profiles for the AgF based samples. All cells and testing protocols were similar to that utilized in the molybdenum based samples.

FIG. 9 shows the electrochemical discharge profiles for the AgF based SNOF samples. All cells and testing protocols were similar to those utilized in the molybdenum based samples described in Example 3. Performance was significantly degraded in the compositionally heterogeneous phases contained at 0.67 and 0.70 relative to that observed for the perovskite dominant phases found for compositions of 0.80 and higher. The density of the silver niobium oxyfluoride was measured through helium pychnometry and results indicated a high density of 7.9 g/cc. Table 1 shows that the silver niobium oxyfluoride has a higher energy density than that of SMOF, especially in the more desirable 3V area.

TABLE 1

Comparison of energy densities of select silver molybdenum oxyfluoride (SMOF) and silver niobium oxyfluoride (SNOF) materials.

| Battery | V1 | C1 (Ah/L) | E1 (Wh/L) | V2 | C2 (Ah/L) | E2 (Wh/L) | E (Wh/L) |
|---|---|---|---|---|---|---|---|
| Li/SMOF (AgF, x = 70) | 3.18 V | 626 | 1991 | 2.5 V | 456 | 1140 | 3131 |
| Li/SMOF (AgF, x = 85) | 3.33 V | 655 | 2182 | 2.5 V | 325 | 811 | 2993 |
| Li/SNOF (AgF, x = 85) | 3.2 V | 757 | 2423 | 2.5 V | 312 | 780 | 3203 |

C1 refers to the volumetric capacity based on ampere hour per volume (Ah/L) at the first voltage plateau V1. E1 refers to the energy density based on watts hours per volume (Wh/L) at the first voltage plateau V1. x refers to molar percentage of AgF used as reactant.

In summary, electroactive silver molybdenum and silver niobium oxyfluoride perovskites of nanocrystalline size were synthesized through the use of AgF, $AgF_2$ and $Nb_2O_5$, $MoO_3$ precursors by mechanochemical methods. The attractive electrochemical performance attributes of the unstable and insulative $AgF_2$ and AgF compounds were realized through the fabrication of this new nanostructured perovskite. Its very good conductivity and transport has led to a high volumetric energy density (4022 mWh/cc) already exceeding silver vanadium oxide SVO (4000 mWh/cc), today's state of the art in the biomedical community. Table 2 shows that at the more useable higher voltage plateau (2666 Wh/L), the perovskite phase exceeds the energy density of the state of the art SVO (1411 mWh/L) by almost a factor of two.

TABLE 2

The electrochemical characteristics of Li/SVO and Li/SMOF batteries.

| Battery system | Average voltage $V_1$ | Volumetric Capacity (mAh/cc) $C_1$ | Volumetric energy density (mWh/cc) $E_1$ | Average voltage $V_2$ | Volumetric Capacity (mAh/cc) $C_2$ | Volumetric energy density (mWh/cc) $E_2$ | Volumetric energy density (mWh/cc) E |
|---|---|---|---|---|---|---|---|
| Li/SVO | 3.2 V | 441 | 1411 | 2.4 | 1080 | 2592 | 4003 |
| Li/SMOF | 3.4 V | 784 | 2666 | 2.4 | 565 | 1356 | 4022 |

The silver molybdenum oxyfluorides and silver niobium oxyfluorides are compositions that allow substitutions. Such substitutions may or may not further improve performance of the present invention as described herein. Substitutions and defects within the perovskite structure are well known. The structures and formulas presented herein are to be used as a guide to describe the general atomic structure of the material. Finally, while the nominal compositions given throughout this application are those required by the high energy milling process, small degrees of silver loss may occur thereby reducing the silver content of the final product to that of the final formula. Other methods may be utilized to fabricate such materials such as solid state chemistry and solution chemistry.

Example 5

Fabrication of Pure $Ag_2F$ Phase Through Mechanochemistry Reaction

Figure 10:
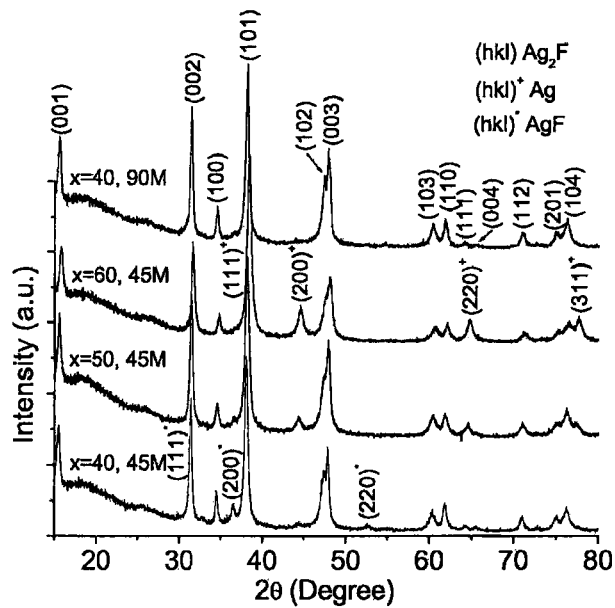
FIG. 10 shows XRD patterns of the samples prepared by high-energy milling x Ag: (1-x) AgF for a different period. Labels indicate high-energy milling time (M=min).
Figure 11:
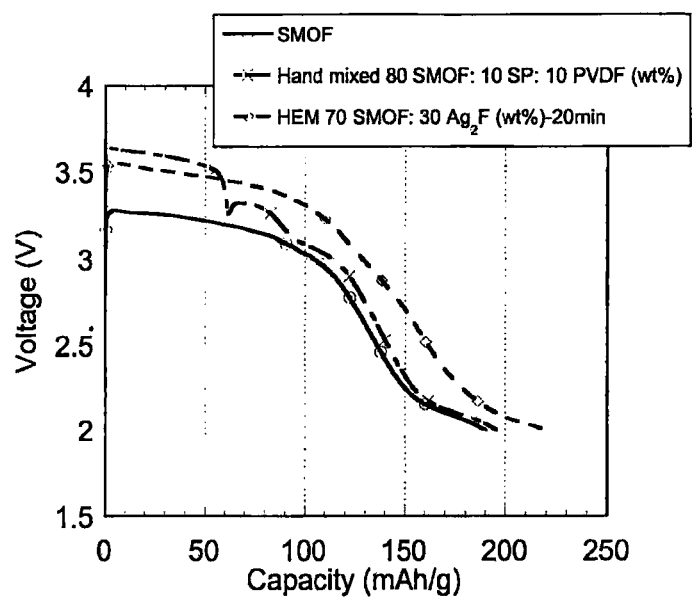
FIG. 11 shows voltage profiles of different samples showing the effects of metallic $Ag_2F$ phase and conventional carbon matrix on the electrochemical performance of SMOF perovskite (cryolite structure). The cells were cycled at 7.58 mA/g in 1 M $LiPF_6$ EC: DMC at room temperature.

Pure $Ag_2F$ phase was fabricated through a mechanochemistry reaction by high-energy milling x Ag:(1-x) AgF for a designated time. FIG. 10 shows that the pure metallic $Ag_2F$ phase was successfully fabricated by high-energy milling 40 mol % Ag and 60 mol % AgF for 90 minutes. This composition was utilized to fabricate pure metallic $Ag_2F$ phase for the electrochemical investigation of its effect on the electrochemistry of SMOF cryolite. The material prepared by high-energy milling 70 mol % AgF: 30 mol % MoO3 for 45 min was used as the standard SMOF sample. Electrochemical studies were performed by introducing the powder of (1) pure SMOF, (2) manually mixed 80 SMOF: 10 SP: 10 PVDF (wt %) and (3) high-energy milled 70 SMOF: 30 $Ag_2F$ (wt %) for 20 min. FIG. 11 shows that the electrochemical performance of pure SMOF powder (V=3.15 V, C=190 mAh/g) was improved with the presence of the conducting matrix of both carbon (V=3.33 V, C=195 mAh/g) and metallic $Ag_2F$ phase (V=3.32 V, C=221 mAh/g). Considering the very high density of $Ag_2F$ phase relative to carbon, much more volumetric energy density is expected for the high-energy milled 70 wt % SMOF and 30 wt % $Ag_2F$ sample.

What is claimed is:

1. An electrochemical cell comprising:
   (i) a negative electrode;
   (ii) a positive electrode comprising a silver oxyfluoride compound,
   wherein the silver oxyfluoride compound is partially substituted with a metal cation other than silver, wherein the metal cation is molybdenum or niobium, and
   (iii) a separator disposed between the negative and positive electrodes.

2. The electrochemical cell according to claim 1, wherein the partially substituted silver oxyfluoride compound is of a perovskite structure.

3. The electrochemical cell according to claim 1, wherein the partially substituted silver oxyfluoride compound is nanocrystallite size.

4. The electrochemical cell according to claim 1, wherein the partially substituted silver oxyfluoride compound comprises $Ag^{1+}{}_y Me^{n+}{}_1 O^{2-}{}_x F^{1+}{}_z$, wherein
   (a) $0.75 < y < 10$
   (b) $x > 0$ and $z > 0$
   (c) $2x + 1z = y + n$
   (d) $2 < n^+ < 6$
   (e) Me is a metal other than Ag, Mo or Nb.

5. The electrochemical cell according to claim 4, wherein y is $1 < y < 5$.

6. The electrochemical cell according to claim 4, wherein y is $3 < y < 5$.

7. The electrochemical cell according to claim 4, wherein $y = 3$.

8. The electrochemical cell according to claim 4, wherein $x = z$.

9. The electrochemical cell according to claim 4, wherein Me is a transition metal.

10. The electrochemical cell according to claim 4, wherein Me is a first row transition metal.

11. The electrochemical cell according to claim 4, wherein Me is a second row transition metal.

12. The electrochemical cell according to claim 4, wherein Me is partially substituted with a metal cation selected from the group consisting of Bi, Cu, V, or any mixture thereof.

13. The electrochemical cell according to claim 4, wherein the partially substituted silver oxyfluoride compound comprises a nanoperovskite structure.

14. The electrochemical cell according to claim 13, wherein the nanoperovskite has a diameter of about 1 nm to about 100 nm.

15. The electrochemical cell according to claim 13, wherein the nanoperovskite has a diameter of about 20 nm to about 50 nm.

16. The electrochemical cell according to claim 13, wherein the nanoperovskite is a distorted nanoperovskite.

17. The electrochemical cell according to claim 13, wherein the nanoperovskite is a cryolite perovskite structure.

18. The electrochemical cell according to claim 1, further comprising a conductive matrix.

19. The electrochemical cell according to claim 18, wherein the conductive matrix is a conductive matrix selected from the group consisting of $VO_2$, $MoO_2$, $MoO_3$, $V_2O_5$, $V_6O_{13}$, NiO, CuO, Ag, $Ag_2F$, a carbon fluoride, a molybdenum sulfide, a molybdenum oxysulfide, titanium sulfide, phosphates, tellurides, selenides, chromium oxide, and manganese oxide.

20. The electrochemical cell according to claim 19, further comprising a solid state electrolyte.

21. The electrochemical cell according to claim 1, wherein the partially substituted silver oxyfluoride compound comprises $Ag^{1+}{}_y Me^{n+}{}_1 O^{2-}{}_x F^{1-}{}_z$, wherein (a) 0.75<y<10
(b) x>0 and z>0
(c) 2x+1z=y+n
(d) 2<$n^+$>6
(e) Me is Mo or Nb;
(f) where Me is a partially substituted component consisting of $Me_{1-w}$, wherein
 (i) (w) refers to percentage substituted of Me, and
 (ii) (w) is less than 50%.

22. The electrochemical cell according to claim 21, wherein y is 1<y<5.

23. The electrochemical cell according to claim 21, wherein y is 3<y<5.

24. The electrochemical cell according to claim 21, wherein y=3.

25. The electrochemical cell according to claim 21, wherein x=z.

26. The electrochemical cell according to claim 21, wherein Me is partially substituted with a transition metal.

27. The electrochemical cell according to claim 21, wherein Me is partially substituted with a first row transition metal.

28. The electrochemical cell according to claim 21, wherein Me is partially substituted with a second row transition metal.

29. The electrochemical cell according to claim 21, wherein Me is partially substituted with a metal cation selected from the group consisting of Bi, Cu, V, or any mixture thereof, and w is not 0.

30. The electrochemical cell according to claim 21, wherein the partially substituted Me component $Me_{1-w}$ is partially substituted with an alternative metal cation selected from the group consisting of V, Ti, Cr, Mn, Fe, Co, Ni, Cu, Ag and Ga.

31. The electrochemical cell according to claim 21, wherein the partially substituted silver oxyfluoride compound comprises a nanoperovskite structure.

32. The electrochemical according to claim 31, wherein the nanoperovskite has a diameter of about 1 nm to about 100 nm.

33. The electrochemical cell according to claim 31, wherein the nanoperovskite has a diameter of about 20 nm to about 50 nm.

34. The electrochemical cell according to claim 31, wherein the nanoperovskite is a distorted nanoperovskite.

35. The electrochemical cell according to claim 31, wherein the nanoperovskite is a cryolite perovskite structure.

36. The electrochemical cell according to claim 1, wherein the partially substituted silver oxyfluoride compound is used in an electrode of a rechargeable battery.

37. The electrochemical cell according to claim 1, further comprising an electrolyte.

* * * * *